United States Patent
Mamei et al.

(10) Patent No.: US 8,322,797 B2
(45) Date of Patent: Dec. 4, 2012

(54) HYDRAULIC DEVICE FOR ACTUATING THE BRAKING OF WORK VEHICLES AND THE LIKE

(75) Inventors: Andrea Mamei, Modena (IT); Eronne Mamei, Franzione Cittanova (IT)

(73) Assignee: Safim S.p.A., Modena (IT)

( * ) Notice: Subject to any disclaimer, the term of this patent is extended or adjusted under 35 U.S.C. 154(b) by 361 days.

(21) Appl. No.: 12/452,790

(22) PCT Filed: Jul. 29, 2008

(86) PCT No.: PCT/EP2008/059910
§ 371 (c)(1),
(2), (4) Date: Jan. 22, 2010

(87) PCT Pub. No.: WO2009/016167
PCT Pub. Date: Feb. 5, 2009

(65) Prior Publication Data
US 2010/0127560 A1   May 27, 2010

(30) Foreign Application Priority Data

Jul. 30, 2007   (IT) ................. MO07A0254

(51) Int. Cl.
*B60T 15/00*   (2006.01)

(52) U.S. Cl. .......................................... 303/2; 303/9.65
(58) Field of Classification Search ............ 303/2, 9.65; 188/355; 417/305, 374
See application file for complete search history.

(56) References Cited

U.S. PATENT DOCUMENTS

| | | | | |
|---|---|---|---|---|
| 2,279,403 | A | * | 4/1942 | Kottmann ..................... 417/425 |
| 3,724,609 | A | * | 4/1973 | Kobald ......................... 188/170 |
| 4,175,793 | A | * | 11/1979 | Clemmons ...................... 303/89 |
| 4,195,716 | A | | 4/1980 | Wirt |
| 4,254,845 | A | | 3/1981 | Braun |
| 4,307,917 | A | * | 12/1981 | Hasselbacher et al. ......... 303/71 |
| 4,813,518 | A | * | 3/1989 | Akiyama et al. .............. 188/170 |
| 5,984,425 | A | | 11/1999 | Orzal |
| 6,837,690 | B2 | * | 1/2005 | Schreiber et al. .......... 417/199.2 |

* cited by examiner

Primary Examiner — Robert A Siconolfi
Assistant Examiner — Stephen Bowes
(74) Attorney, Agent, or Firm — Modiano & Associati; Albert Josif; Daniel J. O'Byrne

(57) ABSTRACT

A hydraulic device for actuating the braking of work vehicles and the like, comprising a duct for connecting the delivery duct to the discharge duct or to an auxiliary duct, along which there are auxiliary pumping elements, which can be actuated in order to pump pressurized liquid into the feed duct; a one-way valve being provided which allow the liquid to flow along the connecting duct exclusively toward the delivery duct.

9 Claims, 3 Drawing Sheets ized delivery branch of a hydraulic circuit;
HYDRAULIC DEVICE FOR ACTUATING THE BRAKING OF WORK VEHICLES AND THE LIKE The present invention relates to a hydraulic device for actuating the braking of work vehicles and the like.

BACKGROUND OF THE INVENTION

Generally, work vehicles used in the industrial and nonindustrial field, such as for example fork-lift trucks, trucks, earth-moving machines, et cetera, are provided with service brakes or parking brakes actuated by elastic means which allow to slow down the moving vehicle and keep it stationary in safe conditions.

These service brakes are generally connected to a hydraulic system, which is provided with jacks adapted to contrast the force applied by the elastic means.

The branches for feeding the jacks are connected selectively to the pressurized delivery branch or to the discharge branch of the hydraulic system by means of a control valve, which is adapted to control, by way of the gradual opening/closing of the corresponding connecting ports, the pressure of the liquid (normally but not exclusively oil) that acts on the jacks.

By modulating the pressure of the liquid that acts on the jacks, the resulting braking force that acts on the brakes is adjusted and accordingly so is the intensity of the braking force.

The control valves used in these hydraulic systems have manual activation, i.e., are actuated directly by an operator by means of a lever, a pedal or the like.

If a malfunction of the hydraulic system, of the engine system or the like occurs, with a consequent drop in pressure on the delivery branch, once the service brakes have been activated the work vehicle cannot move, since the lack of pressure in the delivery branch prevents the overcoming of the force applied by the elastic means and therefore prevents the release of the brakes.

In emergency conditions, such as when the work vehicle is a particular hindrance or danger in performing normal work or traffic operations, it may be necessary to remove such vehicle.

To allow this movement, the hydraulic systems can be provided with safety means for emergency deactivation of the service brakes.

These safety means are distinguished according to the manner in which they deactivate the braking system, i.e., by mechanical or hydraulic action.

The former in practice apply a direct mechanical action to the jacks in contrast with the force applied by the elastic means, compressing them and thus reducing the braking force.

However, these mechanical means require the operator to leave the control cab of the work vehicle and act manually on the jacks. This operation is not only awkward but also unsafe, since the operator is close to the vehicle when the service brakes are disabled.

As an alternative to mechanical safety means, hydraulic means are used.

Hydraulic safety means use an emergency cock with manual activation, which is arranged along the branch for feeding the jacks downward of the control valve and which, in normal operating conditions, connects the feed branch to such valve, but in emergency conditions can be switched in order to connect the feed branch to the discharge branch or to another auxiliary duct.

In this manner, a quantity of liquid drawn from the discharge branch or from the auxiliary duct and sufficient to allow the momentary or prolonged deactivation of the service brakes is sent into the active chamber of the jacks by way of pumping means.

These known hydraulic safety means are not free from drawbacks, which include the fact that by switching the emergency cock to the position that connects the feed branch to the discharge branch or to the auxiliary duct, in practice the delivery branch is disabled.

In this position, by bypassing the control valve, the jack feed branch is in fact no longer connected to the delivery branch, and therefore it is not possible to restore the normal operation of the hydraulic system, and therefore of the braking system, without first returning the cock to the initial position.

To restore the normal operation of the braking system, it is accordingly necessary to perform at least two operations, i.e., switch the emergency cock to the initial position and act on the activation lever of the control valve in order to return it to the desired configuration.

These operations are awkward and do not allow immediate use of the work vehicle after solving the problems that caused the malfunction.

SUMMARY OF THE INVENTION

The aim of the present invention is to eliminate the abovementioned drawbacks of the background art by providing a hydraulic device for actuating the braking of work vehicles and the like which allows to deactivate the braking system in emergency conditions without disabling the delivery branch, i.e., without affecting the normal operation of the hydraulic system.

Within this aim, an object of the present invention is to allow, once the causes of the malfunction of the hydraulic system have been solved, immediate use of the work vehicle according to its normal functionalities.

Another object of the present invention is to provide a hydraulic device which is simple, relatively easy to provide in practice, safe in use, effective in operation, and of relatively low costs.

This aim and these and other objects, which will become better apparent hereinafter, are achieved by the present hydraulic device for actuating the braking of work vehicles and the like, which comprises:
- at least one delivery duct, which can be connected to the pressurized branch of a hydraulic circuit;
- at least one discharge duct, which can be connected to the discharge and recovery branch of the hydraulic circuit;
- at least one duct for feeding a hydraulic actuator of a braking system released by elastic means;
- at least one control valve, which is interposed between said delivery duct, said discharge duct and said feed duct and can move on command between at least one first position, in which said delivery duct can be connected to said feed duct in order to contrast the action of said elastic means, and at least one second position, in which it connects said discharge duct to said feed duct in order to avoid contrasting the action of said elastic means;
- safety means for emergency deactivation of the braking system, which comprise auxiliary means for pumping pressurized liquid in said feed duct;

characterized in that said safety means comprise a duct for connecting said delivery duct to said discharge duct or to an auxiliary duct which can be connected to an auxiliary reservoir; said auxiliary pumping means being arranged along said connecting duct and being actuatable in order to pump pressurized liquid into said feed duct when said control valve is in said first position; one-way valve means being provided which are adapted to allow the flow of the liquid along said connecting duct exclusively from said discharge duct or from said auxiliary duct toward said delivery duct.

BRIEF DESCRIPTION OF THE DRAWINGS

Further characteristics and advantages of the present invention will become better apparent from the following detailed description of a preferred but not exclusive embodiment of a hydraulic device for actuating the braking of work vehicles and the like, illustrated by way of non-limiting example in the accompanying drawings, wherein.

DESCRIPTION OF THE PREFERRED EMBODIMENTS

Figure 1:
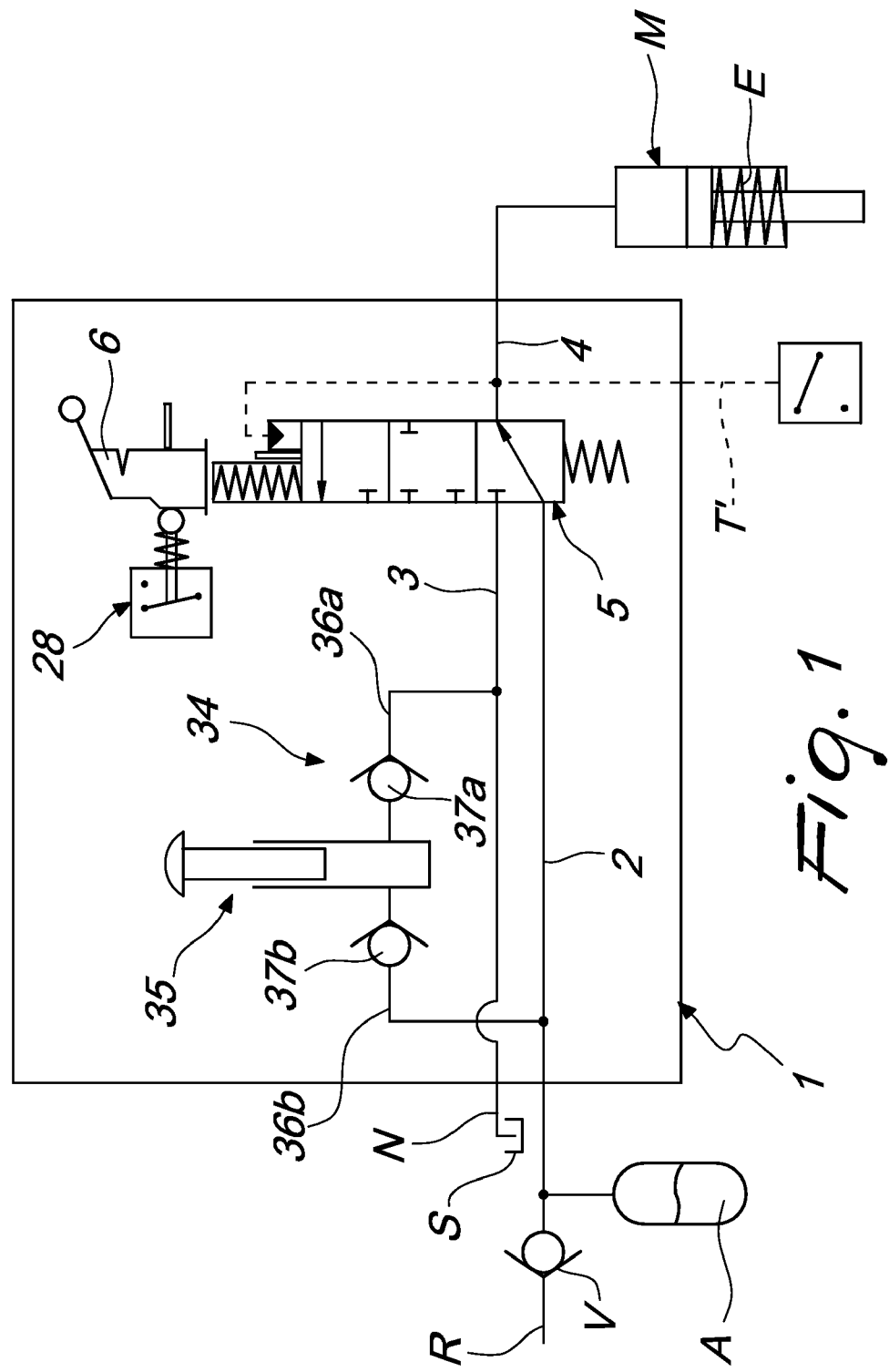
FIG. 1 is a diagram of the hydraulic device according to the invention.

With reference to the figures, the reference numeral 1 generally designates a hydraulic device for actuating the braking of work vehicles and the like according to the invention.

The device 1 comprises at least one delivery duct 2, which can be connected to a pressurized branch R of a hydraulic circuit, along which there can be an accumulator A and at least one one-way valve V, and at least one discharge duct 3, which can be connected to a discharge and recovery branch N of the hydraulic circuit which ends in a reservoir S.

The device 1 further comprises a feed duct 4 for feeding a hydraulic actuator of a braking system, for example a single-action jack M, which is biased by elastic means E as seen in FIG. 1.

A control valve 5 is interposed between the delivery duct 2, the discharge duct 3 and the feed duct 4 and can move on command between at least one first position, in which the delivery duct 2 can be connected to the feed duct 4 in order to modulate its pressure and contrast the action of the elastic means E, and a second position, in which it connects the discharge duct 3 to the feed duct 4 in order to avoid contrasting the action of the elastic means E.

Advantageously, as shown in the hydraulic diagram of FIG. 1, the control valve 5 is a slide valve with three ways, three positions and of closed center, which is actuated by way of manual actuation means 6, such as for example a lever.

In the diagram of FIG. 1, the control valve 5 is shown in the inactive condition.

Figure 2:
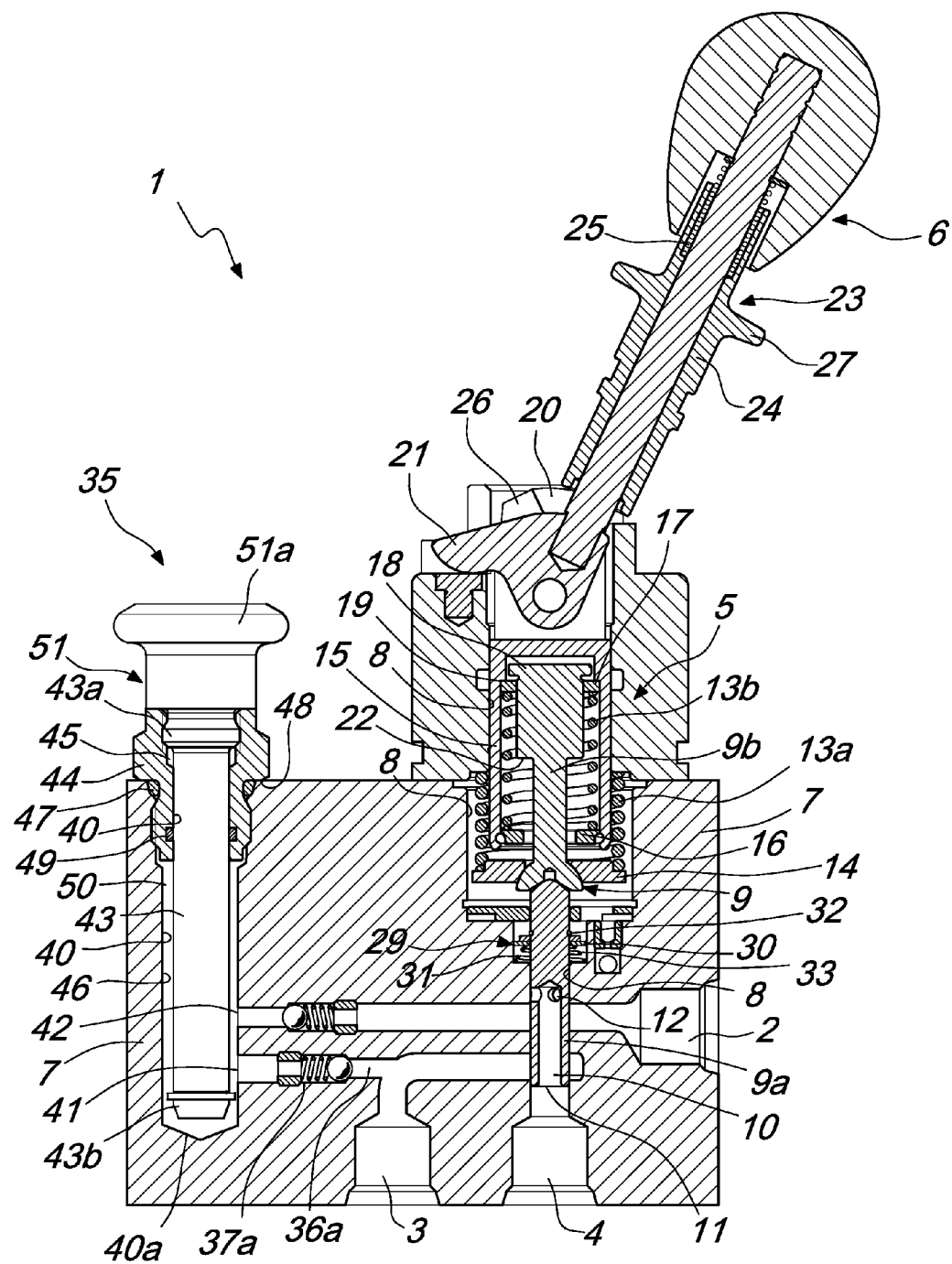
FIG. 2 is a transverse sectional view of the device according to the invention in a particular embodiment, with the piston in the intake start/delivery end position.
Figure 3:
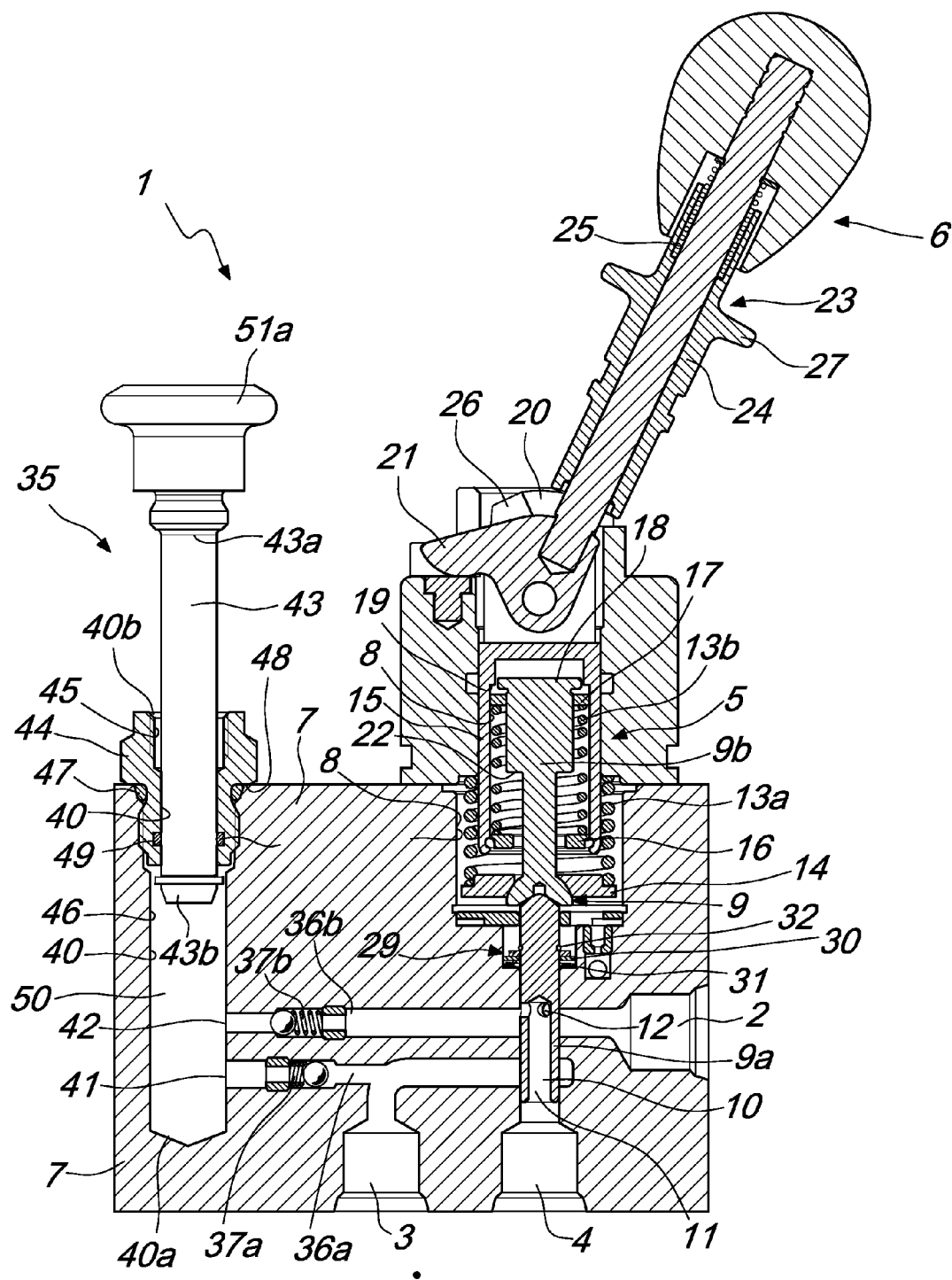
FIG. 3 is a transverse sectional view of the device according to the invention in the embodiment of FIG. 2, with the piston in the intake end/delivery start position.

A preferred but not exclusive embodiment of the control valve 5 is shown in FIGS. 2 and 3.

In this embodiment, the control valve 5 comprises an outer casing 7, inside which there is a longitudinal seat 8, which is connected, by way of respective connecting ports, to the delivery duct 2, to the discharge duct 3 and to the feed duct 4.

A slider 9 is inserted slidingly within the longitudinal seat 8 and is constituted by a flow control element 9a and a spool 9b, both of which are elongated longitudinally and are kept in mutual contact.

A longitudinal cavity 10 is formed on the flow control element 9a at the ports for connection to the various ducts and is open at an outlet port 11 which faces the feed duct 4 and a plurality of transverse orifices 12, which are connected to the cavity 10.

The edge of the outlet port 11 forms a reaction surface of the slider 9 which is sensitive to the pressure of the liquid that is present in the feed duct 4.

The movements of the slider 9 within the longitudinal seat 8 are adjusted by the position of the lever 6 and by the pressure of the liquid that is present in the feed duct 4, which acts on the reaction surface of the flow control element 9a.

The slider 9, by moving in the direction toward the port for connection to the feed duct 4, connects the feed duct 4 to the delivery duct 2, thus sending pressurized liquid into the active chamber of the jack M (which corresponds to a reduction in the braking capacity of the braking system).

Vice versa, the movement of the slider 9 in the opposite direction entails the connection of the feed duct 4 to the discharge duct 3 and the consequent sending of liquid into the reservoir S (which corresponds to an increase in the braking capacity of the braking system).

Actuation means 13 act on the slider 9 and comprise first elastic means 13a, which are adapted to push the slider 9 in the direction that contrasts the thrust of the liquid on the reaction surface of the flow control element 9a, and second elastic means 13b, which are adapted to contrast the action of the first elastic means 13a.

In a preferred embodiment, the first elastic means 13a are constituted by a first helical spring, which is preloaded by compression and is wound around the spool 9b and interposed between an abutment element 14, in contact with the end of the spool 9b which is adjacent to the flow control element 9a, and the casing 7.

The second elastic means 13b are further constituted by a second helical spring, which is preloaded by compression and is also wound around the spool 9b and contained in a cup-shaped element 15, which can slide within the longitudinal seat 8 and has its closed end directed away from the feed duct 4.

The second spring 13b has a first end which is directed toward the feed duct 4 and is associated with a first abutment element 16, for example a washer, which is coupled to the cup-shaped element 15, and a second end, which is associated with a second abutment element 17, for example a retention ring, which is arranged proximate to the closed end of the cup-shaped element 15 and is adapted to rest, during use, against a shoulder 18 which is formed on the spool 9b or against a recess 19 formed on the internal walls of the cup-shaped element 15.

The action of the actuation means 13, particularly of the second spring 13b, is adjusted by the lever 6, which is rotatably associated with a supporting element 20, which is coupled to the cup-shaped element 15 and is provided with an eccentric element 21, which by resting against the casing 7 converts the rotation of the lever 6 into a rectilinear movement of the cup-shaped element 15.

The movement of the cup-shaped element 15 in practice influences the compression of the second spring 13b and therefore the force that it applies, in contrast with the first spring 13a, to the slider 9.

The lever 6 can move alternately between two extreme positions, which corresponds to the first and second positions of the control valve 5.

When the lever 6 is in the position that corresponds to the first position of the control valve 5, i.e., in the right position in FIGS. 2 and 3, the retention ring 17 rests against the recess 19. The second spring 13b therefore does not act on the slider 9, on which only the first spring 13a acts.

In this position, the slider 9 reaches a balanced position in which the thrust of the first spring 13a is balanced by the pressure of the fluid that is present in the feed duct 4 of the jack M.

In practice, the pressure of the fluid in the feed duct 4 is determined by the extent of the preloading of the first spring 13a.

The movement of the lever 6 toward the second extreme position (on the left in FIGS. 2 and 3), which corresponds to the second position of the control valve 5, entails the sliding of the cup-shaped element 15 in the direction away from the port for connection to the feed duct 4. This sliding moves the retention ring 17 into abutment against the shoulder 18, consequently compressing the second spring 13b, which thus applies to the slider 9 a force which is opposite to the force applied by the first spring 13a.

With the lever 6 in the intermediate position between the two extreme positions, i.e., arranged substantially along the axis of the longitudinal seat 8, the pressure of the liquid in the feed duct 4 is modulated at an intermediate pressure that derives from the balance between the first and second springs 13a and 13b.

Therefore, the pressure in the feed duct 4 undergoes a sudden drop when the second spring 13b is activated and then decreases gradually as the lever 6 moves toward the second extreme position, and decreases again suddenly, when said position is reached, to the discharge pressure, which generally corresponds to ambient pressure.

Indeed, when the lever 6 is in the second extreme position, which is symmetrically opposite to the one that defines the first position of the control valve 5 with respect to the axis of the longitudinal seat 8, the retention ring 17 and the washer 16 rest, as a consequence of the movement of the cup-shaped element 15 away from the port for connection to the delivery duct 2, respectively against the shoulder 18 and against a contact surface 22 which is formed on the spool 9b. In this position, the force applied by the second spring 13b to the slider 9 is greatest, and the washer 16 moves the spool 9b mechanically, consequently opening the passage from the discharge duct 3 to the feed duct 4 and therefore allowing the activation of the braking system.

The lever 6 is provided with means for removable retention 23 of the lever 6 in the position that corresponds to the second position of the control valve 5, i.e., to the complete engagement of the brakes of the work vehicle.

The retention means 23 comprise a tubular body 24, which is fitted coaxially on the lever 6 and can slide with respect to it. Third elastic means 25 are interposed between the lever 6 and the tubular body 24 and are adapted to push the tubular body 24 toward the supporting element 20, on which there is a slot 26 which is adapted to accommodate the tubular body 24 in the stroke limit position of the lever 6 that corresponds to the second position of the control valve 5.

In this position, the tubular body 24 enters the slot 26 by way of the third elastic means 25; to return the lever 6 toward the opposite position it is necessary to lift the tubular body 24, by means of wings 27, in contrast with the third elastic means 25, disengaging it from the slot 26.

Advantageously, a microswitch 28 with magnetic activation, for example a Reed sensor, is functionally connected to the lever 6 and is adapted to change state during the movement of the lever 6. The microswitch 28, by activating, sends an electrical signal to the electronic control unit of the work vehicle, which is converted into a luminous and/or acoustic signal adapted to warn and inform the operator of the movement of the lever 6.

As an alternative, the activation of the microswitch 28 can entail the actuation of other functions controlled by the electronic controller of the work vehicle.

It is further possible to connect to the control valve 5, by means of a reading branch T', a pressure switch, not shown in the figures, which is adapted to detect the pressure in the active chamber of the jack M.

The control valve 5 is further provided with means 29 for stabilizing the sliding of the slider 9 in the longitudinal seat 8.

The stabilizing means 29 comprise a disk 30, which is fitted coaxially around the flow control element 9a and is kept connected thereto by means of a conical helical spring 31, which pushes the disk 30 against a locking ring 32.

The disk 30 forms, together with the walls of the longitudinal seat 8, an isolated volume 33; the traction of the disk 30 by means of the slider 9 produces the pumping by bleeding of the liquid in input to and in output from the volume 33 and therefore the damping of the vibrations of the slider 9.

To prevent a pressure drop in the pressurized branch R of the hydraulic system from not allowing to contrast the force applied by the elastic means E to the jack M, the device 1 comprises safety means 34 for emergency deactivation of the braking system.

The safety means 34 comprise auxiliary pumping means 35, which are adapted to send pressurized liquid into the feed duct 4.

The auxiliary pumping means 35 are arranged along a duct 36 for connecting the delivery duct 2 to the discharge duct 3 or to an auxiliary duct which can be connected to an auxiliary reservoir and contains the liquid conveyed in the hydraulic circuit.

The embodiments shown in the figures refer to the solution in which the connecting duct 36 connects the delivery duct 2 to the discharge duct 3, without thereby excluding alternative embodiments in which the delivery duct 2 can be connected to an auxiliary duct, which is not shown in the figures.

The pumping means 35 can be actuated to pump pressurized liquid into the feed duct 4, with the control valve 5 in the first position. In this position, the thrust of the first spring 13a in fact is not contrasted by the pressure of the liquid in the feed duct 4, and therefore the orifices 12 connect the delivery duct 2 to the feed duct 4.

Advantageously, the pumping means 35 can be actuated with the control valve 5 in any position, since if the slider 9 does not connect the delivery duct 2 to the feed duct 4, the liquid drawn from the discharge duct 3 can be used to fill the accumulator A.

In any case, the transfer of the liquid to the feed duct 4 occurs by moving the control valve 5 into the first position.

The connecting duct 36 comprises a first portion 36a, which is interposed between the discharge duct 3 and the pumping means 35, and a second portion 36b, which is interposed between the pumping means 35 and the delivery duct 2.

In particular, the second portion 36b is connected to the delivery duct 2 upstream of the control valve 5 in the liquid flow direction, in practice surrounding in a circular fashion the flow control element 9a.

Conveniently, along the connecting duct 36 there are one-way valve means 37, which are adapted to allow the flow of the liquid along the connecting duct 36 exclusively from the discharge duct 3 to the delivery duct 2.

Advantageously, the valve means 37 comprise a first one-way valve 37a and a second one way valve 37b, which are located respectively along the first and second portions 36a and 36b of the connecting duct 36 in order to prevent the passage of the liquid from the pumping means 35 toward the discharge duct 3 and from the delivery duct 2 toward the pumping means 35.

The valve means 37 can be omitted if the pumping means 35 are of the type of a vane or gear pump, since as is known these types of pump do not require one-way valves.

The liquid that arrives from the discharge duct 3 and is pumped into the second portion 36b is then sent by means of the feed duct 4 into the active chamber of the jack M.

In this manner, the safety means 34 operate in parallel with the main hydraulic system and can be activated at all times without interfering with the normal operation of such system.

The activation of the pumping means 35 in fact does not entail the disabling of the pressurized branch R of the hydraulic system or the bypassing of the control valve 5.

Preferably, the device 1 comprises means 38 for manual activation of the pumping means 35.

In a preferred embodiment, shown in FIGS. 2 and 3, the activation means 38 are of the type of a piston pump and comprise a hollow containment body 39, which includes a blind seat 40 which is extended longitudinally and on the walls of which there is at least one intake port 41, which is connected to the discharge duct 3, and at least one delivery port 42, which is connected to the delivery duct 2, and a piston 43, which is inserted coaxially in the blind seat 40 and can slide longitudinally inside it.

Conveniently, the containment body 39 is constituted by the casing 7 and by a threaded element 44, which comprises a through opening 45 which engages at the open end of a blind compartment 46 formed on the casing 7. The blind seat 40 is thus formed by the walls of the opening 45 and of the compartment 46.

A sealing element 47 is interposed between the outer surface of the threaded element 44 and the walls of the compartment 46 and is advantageously positioned between the thread of the threaded element 44 and an abutment surface 48 of the threaded element 44, which rests, in engagement, on the outer surface of the casing 7.

However, embodiments are not excluded in which the containment body 39 is formed exclusively by the casing 7, the compartment 46 of which substantially forms the blind seat 40 inside which the piston 43 slides.

At least one sealing element 49 is interposed between the piston 43 and the walls of the blind seat 40, particularly of the opening 45, so as to form a substantially hermetic chamber 50.

The piston 43 can move in order to vary the useful volume of the chamber 50 from at least one intake start/delivery end configuration, in which the useful volume of said chamber 50 is smallest, to an intake end/delivery start configuration, in which the useful volume of the chamber 50 is greatest.

Conveniently, the activation means 38 comprise means 51 for releasable locking of the pumping means 35.

The locking means 51 comprise a knob 51a, which is associated with an upper portion 43a of the piston 43 that lies opposite its lower portion 43b, which faces the closed bottom 40a of the blind seat 40, which is provided with a threaded portion which is adapted to engage, when the piston 43 is in the intake start/delivery end configuration, a corresponding threaded region formed on the containment body 39, particularly on the threaded element 44, at the open portion 40b of the blind seat 40.

With the knob 51a engaged with the threaded region of the containment body 39, the piston 43 cannot be lifted from the intake start/delivery end configuration, and in this manner the operation of the pumping means 35 is inhibited and the piston 43 does not hinder the operator.

The device 1 is then enclosed by a containment box, not shown in the figures, from which the lever 6 and the knob 51a protrude, the knob 51a being moved away from the containment box with the piston 43 in the intake end/delivery start configuration.

The device 1 thus provided can be inserted in a hydraulic system by connecting the delivery duct 2, the discharge duct 3 and the feed duct 4 respectively to its delivery branch, to its discharge branch and to the active chamber of the jack M.

The operation of the present invention is as follows.

In normal operating conditions, in order to deactivate the braking system of work vehicle, the control valve 5 is moved, by acting on the lever 6, to the first position, thus connecting the delivery duct 2, which contains pressurized liquid, to the feed duct 4 of the jack M.

In this manner, the pressure of the liquid overcomes the force that the elastic means E apply to the jack M, releasing the brakes.

As described above, in this position the pressure of the fluid to the jacks is determined by the extent of the preloading of the first spring 13a.

In practice, the slider 9 connects the delivery duct 2 to the feed duct 4 until it reaches a balanced situation in which the thrust of the first spring 13a is balanced by the pressure of the liquid that acts on the reaction surface of the flow control element 9a.

Vice versa, in order to perform braking, the lever 6 is moved so as to move the control valve 5 into the second position. In this configuration, the feed duct 4 is now connected to the discharge duct 3 and the liquid that is present in the active chamber of the jack M is discharged into the reservoir S.

If a malfunction or any technical problem causes a pressure drop along the pressurized branch R, the hydraulic system is no longer capable of providing the liquid with a pressure which is sufficient to overcome the force applied by the elastic means E to release the braking system.

In this situation it is possible to compensate for this pressure drop by activating the auxiliary pumping means 35 manually.

In the example shown in the figures, the pumping means 35 are actuated by moving, after disengaging the knob 51a from the threaded region of the containment body 39, the piston 43 repeatedly from the intake start/delivery end position to the intake end/delivery start position and vice versa, consequently varying the useful volume of the chamber 50.

These movements of the piston 43, which are matched respectively by the generation of a partial vacuum and of an overpressure in the chamber 50, selectively open the first and second one-way valves 37a and 37b and consequently produce the intake and transfer, through the connecting duct 36, of a certain amount of liquid from the discharge duct 3 to the delivery duct 2.

To allow the liquid pumped into the delivery duct 2 to reach the feed duct 4, the control valve 5 must be in the first position, since the orifices 12 connect the delivery duct 2 to the feed duct 4 only in this position.

The safety means 34 can thus be activated at any time and do not compromise the normal operation of the hydraulic system.

If the normal pressure is restored in the pressurized branch R, the hydraulic system and therefore the work vehicle can in fact resume normal operation without the need to intervene on the safety means 34 to disable them.

In practice it has been shown that the invention achieves the proposed aim and objects, and in particular the fact is stressed that it allows to release the braking system in emergency conditions without altering the normal functionalities of the hydraulic system, in practice acting parallel thereto.

In particular, the device according to the invention allows to activate the safety means and to resume the normal operation of the work vehicle easily and quickly, with an extremely reduced number of operations.

The invention thus conceived is susceptible of numerous modifications and variations, all of which are within the scope of the appended claims.

All the details may further be replaced with other technically equivalent elements.

In practice, the materials used, as well as the shapes and dimensions, may be any according to requirements without thereby abandoning the scope of the protection of the appended claims.

The disclosures in Italian Patent Application No. MO2007A000254 from which this application claims priority are incorporated herein by reference.

The invention claimed is:

1. A hydraulic device for actuating the braking of work vehicles, comprising:
   at least one delivery duct, which can be connected to a pressurized branch of a hydraulic circuit whereby said pressurized branch includes an accumulator;
   at least one discharge duct, which can be connected to a discharge and recovery branch of the hydraulic circuit;
   at least one feed duct for feeding a hydraulic actuator of a braking system released by elastic means;
   at least one control valve, which is interposed between said delivery duct, said discharge duct and said feed duct and which is movable on command between at least one first position, in which said delivery duct is connected to said feed duct in order to contrast the action of said elastic means, and at least one second position, in which said discharge duct is connected to said feed duct in order to avoid contrasting the action of said elastic means, said control valve being a three-way slide valve having three positions and a closed center;
   safety means for emergency deactivation of the braking system, which comprise auxiliary means for pumping pressurized liquid in said feed duct;
   said control valve being configured such that, when said feed duct and said delivery duct are mutually disconnected, liquid drawn from said discharge duct fills the accumulator of said pressurized branch, whereby said auxiliary means for pumping pressurized liquid in said feed duct are operable with said control valve in any position: and
   said safety means comprising a duct for connecting said delivery duct to said discharge duct or to an auxiliary duct which can be connected to an auxiliary reservoir; said auxiliary pumping means being arranged along said connecting duct and being actuatable in order to pump pressurized liquid into said feed duct when said control valve is in said first position.

2. The assembly according to claim 1, comprising one-way valve means which are adapted to allow the flow of the liquid along said connecting duct exclusively from said discharge duct or from said auxiliary duct toward said delivery duct.

3. The assembly according to claim 2, wherein said one-way valve means comprise at least one first one-way valve, which is interposed between said auxiliary pumping means and said discharge duct or said auxiliary duct and is adapted to prevent the passage of the liquid respectively from said auxiliary pumping means toward said discharge duct or toward said auxiliary duct, and at least one second one-way valve, which is interposed between said pumping means and said delivery duct and is adapted to prevent the passage of the liquid from said delivery duct toward said auxiliary pumping means.

4. The assembly according to claim 3, wherein said manual activation means comprise a hollow containment body, which includes a blind seat on the walls of which there is at least one intake port, which is connected to said discharge duct or said auxiliary duct, and at least one delivery port, which is connected to said delivery duct, and a piston, which is inserted coaxially in said blind seat and can slide longitudinally inside it, at least one sealing element being interposed between said piston and the walls of said blind seat, so as to form a substantially hermetic chamber;
   said piston being movable in order to vary a volume of said chamber from an intake start/delivery end configuration, in which the volume is smallest, to an intake end/delivery start configuration, in which useful volume is greatest.

5. The assembly according to claim 4, wherein said means for releasably locking said auxiliary pumping means comprise a knob which is associated with the upper portion of said piston which lies opposite the closed bottom of said blind seat, said knob being provided with a threaded portion which is adapted to engage, when said piston is in said intake start/delivery end configuration, a corresponding threaded region formed on said containment body at the open portion of said blind seat.

6. The assembly according to claim 1, comprising means for manual activation of said auxiliary pumping means.

7. The assembly according to claim 6, wherein said manual activation means comprise means for releasably locking said auxiliary pumping means.

8. The assembly according to claim 1, comprising means for the manual actuation of said control valve.

9. The assembly according to claim 8, comprising at least one magnetically activated sensor which is functionally connected to said manual actuation means and is adapted to change state when said manual actuation means are actuated.

* * * * *